United States Patent Office 3,408,332
Patented Oct. 29, 1968

3,408,332
FORMALDEHYDE AND DIENE INTERPOLYMERS
Calvin N. Wolf, Princeton, N.J., assignor to Ethyl Corporation, New York, N.Y., a corporation of Virginia
No Drawing. Filed Apr. 26, 1963, Ser. No. 276,094
20 Claims. (Cl. 260—73)

This invention relates to novel and useful high molecular weight high melting interpolymers composed primarily of formaldehyde. This invention further relates to processes for producing these novel interpolymers.

In the past, Staudinger, in "Die Hochmolecularen Organischen Verbindunger" (1932), set forth a process of polymerizing formaldehyde. The formaldehyde polymers obtained by this process aged in air at 105° C. resulting in the degradation or "unzipping" to monomeric formaldehyde. McDonald, in U.S. Patent 2,768,994, described a new polymerization process whereby high molecular weight formaldehyde homopolymers could be produced which were tough and possessed a higher degree of thermal stability than the low molecular weight polymers of Staudinger. The polymer produced by McDonald, which exhibited excellent properties at low temperatures also tended to degrade or "unzip" at temperatures at which the polymer would be worked, e.g., molded. Thus, in the molding operations which require high temperatures, it was found that polyformaldehyde would degrade rendering the polymer relatively useless for this necessary operation.

Many methods have been attempted to stabilize the high molecular weight formaldehyde homopolymers. A typical method employed utilized the compounding with the formaldehyde polymer of a stabilizer such as hydrazines (U.S. Patent 2,810,708); phenols (U.S. Patent 2,871,220); ureas, thioureas (U.S. Patent 2,893,972); amines (U.S. Patents 2,920,059 and 2,936,298); and benzophenones (Australian Patent 230,163). The art has taught that these stabilizers are compounded into the polymer after the polymerization process. These stabilizers seem to prevent to some extent oxidation, thermal deterioration and photo degradation, however, degradation is still experienced in the high temperatures in the presence of air.

Other methods employed to prevent the "unzipping" of the formaldehyde are the "end capping" of the free hydroxyl groups on the chain ethers of the polymer as set forth, for example, in U.S. Patent 2,964,500. This end capping procedure is successful to a certain degree but total success is not experienced since these end capped polymers also degrade at high temperatures or in the presence of a caustic or other strongly alkaline substances.

Another method of stabilization includes the essentially complete removal of the polymerization catalyst from the polymer since it is believed that the presence of the polymerization catalysts cause degradation or "unzipping" (U.S. Patent 2,989,509). Combinations of the foregoing have also been utilized (Australian Patent 229,481). Copolymerization of formaldehyde with alkaline carbonates, as set forth in U.S. Patent 3,012,990, has also been achieved in order to attempt to produce a thermally stable polymer.

Another method of preventing degradation or unzipping of the formaldehyde polymer has been the copolymerization of trioxane with cyclic ether such as ethylene oxide to produce a polymer having adjacent carbon atoms breaking the oxygen to carbon linkage (U.S. Patent 3,027,352).

It is therefore an object of the present invention to provide novel interpolymers which are stable to acid and resistant to oxidative deterioration and caustic degradation. It is a further object of the present invention to provide new, novel interpolymers which are tough, strong, flexible, and elastic in nature. It is a further object of the present invention to provide novel interpolymers of formaldehyde or trioxane and a diene monomer which have the qualities outlined hereinabove. It is another object of the present invention to provide a process for producing these novel interpolymers having thermal and oxidative stability and exhibiting properties of toughness, strength, and resilience. A particular object is to provide novel high molecular weight diene-formaldehyde interpolymers which have substantially greater resistance to caustic degradation than the high molecular weight polyoxymethylene homopolymers. Other objects of the invention will be apparent from the ensuing description.

It has now been found that the above and other objects are accomplished by the provision of an interpolymer of a formaldehyde and a diene monomer having the formula $R''=R'=R$ wherein each R, R' and R'' are hydrocarbon groups containing from about 1 to about 18 carbon atoms. The diene monomer having the formula above generally contains a total of from about 4 to about 30 carbon atoms in the molecule. The diene monomer may be conjugated or non-conjugated and acyclic or cyclic in structure. Generally, the amount of the diene monomer which may be present in the interpolymers of this invention ranges from about 0.1 mole percent to about 20 mole percent based on the weight of the interpolymer. The preferred amount of diene monomer present ranges from about 1 to about 15 mole percent. Excellent polymers are obtained, especially where the preferred mole percentage of diene monomer is employed, these polymers exhibiting the desirable characteristics of polyoxymethylene in that they are tough, resilient, and resistant to thermal degradation. But unlike the high molecular weight homopolymers of polyoxymethylene, the present novel interpolymers present enhanced resistance to degradation when in contact with strongly alkaline substances.

The diene monomer employed in this invention contains from about 4 to about 30 carbon atoms in the molecule and preferably from about 4 to 12 carbon atoms since the copolymers obtained exhibit superior properties of thermal stability, oxidative stability and stability to chemical deterioration. The most particularly preferred dienes are those containing from about 4 to about 10 carbon atoms since these diene monomers are more economical and more easily obtained. The preferred diene monomers of this invention are isoprene, butadiene, vinyl cyclohexene, chloroprene, bromoprene, 2,3-dimethyl butadiene and the like.

Although not desiring to be bound by theoretical considerations, it is believed that in the novel interpolymers of this invention the diene monomer is bonded intermittently at random to the carbon atoms of the repeating formaldehyde molecule

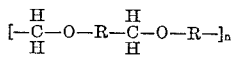

wherein R represents a hydrocarbon group corresponding to the diene comonomer used in forming the copolymer.

A different formula which shows the probable theoretical molecular structure is

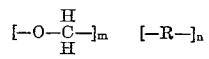

wherein $m$ is an integer representing the total number of polyoxymethylene groups in the polymer and $n$ is a smaller integer representing the total number of hydrocarbon groups from the diene comonomer that are present and scattered at random throughout the polyoxymethylene structure. Therefore, $n$ is from 0.1 to 20 percent of $m$.

The novel interpolymers of this invention have high molecular weights and high melting points. The molecular weights of these novel interpolymers generally range from about 5,000 to about 200,000. However, the preferred molecular weights range from about 10,000 to about 150,000 since the copolymers obtained within this range are more easily adapted for the ultimate end use, e.g., molding, drawing fibers and the like. The molecular weight ranges are a direct function of the inherent viscosity. Thus, inherent viscosity ranging from about 0.3 to about 8.0 are desirable in the polymers of this invention. The most preferred inherent viscosities range from about 0.5 to 5.0 since these viscosities are within the preferred molecular weight range. The inherent viscosity is preferably measured at 0.5 percent by weight in p-chlorophenol containing 2 percent of alpha-pinene at 60° C. The melting point (polymer melt temperature) ranges of the novel interpolymers of this invention generally range from about 140° C. up to about 190° C. The most preferred melt point range for these copolymers is from about 150° C. up to about 185° C. since polymers within this melting point range generally exhibit superior molding characteristics.

An important feature of the novel interpolymers of the present invention is the fact that severe thermal degradation or "unzipping" is not experienced at the elevated temperatures required for molding operations. Coupled with this advantageous feature is the fact that these novel interpolymers exhibit properties of toughness, resilience, strength and flexibility. Still another important feature of the interpolymers of this invention is their resistance to degradation in the presence of strong caustic solutions. Formaldehyde homopolymers in the past have rapidly decomposed into monomeric formaldehyde upon being treated with a strongly alkaline solution. This disadvantage is not experienced to the same extent with the present novel interpolymers and in many cases the only modification experienced when these are treated with caustic solution is the removal of detrimental hydroxyl groups from the polymer. This is advantageous in that the remaining polymer is resistant to the action of acids, alkalis, heat, oxidation and aging. Thus, many of the disadvantages experienced in the prior art formaldehyde polymers have now been overcome, or at least significantly minimized.

The term "interpolymers" as used in this invention, may be further defined as polymers containing two or more monomers as defined above. Thus copolymers, terpolymers, tetrapolymers and the like are all within the ambit of this invention.

A further embodiment of the present invention relates to a process for producing novel diene-formaldehyde interpolymers of this invention. The novel interpolymers of this invention are produced by polymerizing any reactive form of formaldehyde which is essentially anhydrous with one or more diene monomers having from about 4 to about 30 carbon atoms. This polymerization process is conducted in the presence of a catalyst, the nature of which largely depends on the type of formaldehyde being used. Thus, when trioxane is being copolymerized with one or more diene monomers, generally a Lewis acid is employed. However, heterogeneous catalysts, i.e., silica alumina, are also very active in the copolymerization process. Other catalysts, such as Lewis bases, are generally preferred when essentially anhydrous gaseous monomeric formaldehyde is being employed in the copolymerization reaction.

The novel process of the present invention can be conducted utilizing a wide variety of polymerization techniques, e.g., bulk polyminization, solution polymerization, emulsion polymerization, vapor polymerization and like procedures.

Bulk polymerization is achieved by mixing a reactive form of formaldehyde such as trioxane with a catalyst and the desired diene monomer(s). Thereafter the reaction mixture is heated to a temperature from about 50° C. to 120° C. for a period of time to copolymerize the reaction mixture. This reaction time generally varies from a matter of a few seconds to one day, a period ranging from about three minutes to twelve hours generally being sufficient. The resulting polymer obtained may then be ground up and molded or, prior to molding, subjected to purification and/or subjected to other stabilization procedures, e.g., compounded with stabilizers and the like.

Solution polymerization generally comprises contacting formaldehyde such as trioxane with a catalyst and the desired dienes in an inert solvent such as a liquid hydrocarbon at a temperature ranging from about −90° C. up to about 200° C. The reaction is generally conducted at a pressure ranging from about atmospheric up to about 15 atmospheres. The reaction mass is stirred and heated for a time sufficient to obtain the desired molecular weight after which the copolymer product is extracted and allowed to dry. Again, subsequent treatments used in the art for improving the properties may be used as desired.

The inert solvents which may be employed in the solution polymerization process are any solvents which are inert to the reactants. Thus, liquid hydrocarbons (paraffins, cycloparaffins, aromatics, or mixtures of these), glycol ethers, inert monoethers, (dialkyl ethers, dicycloalkyl ethers, diaryl ethers, diaralkyl ethers or mixed ethers in which the organic groups are taken from different classes, viz., alkyl, cycloalkyl, aryl and aralkyl groups). Saturated hydrocarbons, and the like may be employed. Typical of the solvents are hydrocarbons such as hexane, heptane, octane, cyclohexane, methyl cyclohexane, benzene, nitrobenzene, toluene, xylene, petroleum distillates such as naphtha, kerosene, gasoline, halogenated hydrocarbon compounds such as carbon tetrachloride, ethylene dibromide, methylene chloride, glycol ethers, such as the dimethyl ether of diethylene glycol, the diethyl ether of diethylene glycol, monethers such as diethyl ether, dibutyl ether, disyclohexyl ether, dibenzyl ether, diphenyl ether, methylphenenyl ether and the like.

Vapor polymerization comprises contacting in a reaction zone the vapors of formaldehyde or trioxane and the desired diene monomer(s) in the aerosol state in the presence of a catalyst at temperatures ranging from about −20° C up to about 200° C. The pressure at which the vapor polymerization processes can be conducted generally ranges from atmospheric up to about 200 atmospheres, the polymer may then be withdrawn as it is formed in the reaction chamber thereupon optimum workup and/or stabilization procedures may be utilized.

The processes as outlined above are capable of being adapted to a continuous process, a batch process, or semi-batch operation; for example, where vapor polymerization reactions are being conducted it may readily be converted to a continuous process by merely adding the reactants and the catalyst to the reaction zone while recovering the interpolymer as soon as it is formed. An excellent example of a batch-wise process is the bulk polymerization of a formaldehyde such as trioxane with a diene after which the desired polymer may then be recovered.

Generally, it is preferred to employ an essentially anhydrous inert atmosphere over the reaction mass particularly when bulk polymerization techniques are being employed. However, an inert atmosphere may be employed in other polymerization processes such as solution polymerization and vapor polymerization. Typical of the inert gases which may be employed are carbon monoxide, nitrogen, argon, krypton, neon, helium and the like. Certain saturated paraffinic hydrocarbons may also be employed as the inert atmosphere where the hydrocarbons are inert to the reaction mass. Examples of paraffinic hydrocarbons which may be employed are methane, ethane, propane and the like.

The formaldehyde employed as stated hereinabove can be any reactive form of formaldehyde in the essentially anhydrous state. Monomeric formaldehyde and trioxane are the best known reactive anhydrous forms which may be used. Monomeric formaldehyde can be produced by any of the chain prior art methods such as is set forth by Walker in "Formaldehyde," A.C.S., Monograph Series No. 98 (1944). Typical methods employed to obtain monomeric formaldehyde are pyrolyzing p-aldehydes, polyoxymethylene or other forms of formaldehyde. However, it is preferred in this invention to employ trioxane since it is easier to handle especially in bulk polymerization processes. On the other hand, in vapor polymerization processes it is more desirable to employ gaseous monomeric formaldehyde which is essentially anhydrous since this compound is more easily vaporized.

Typical of the Lewis acids which are employed as catalysts in the processes of this invention are inorganic halides, particularly the inorganic fluorides, inorganic fluorides complexed with ethers and amines, methyl alkoxides, sulfonyl halides, metalloidal halides, hydrogen halides and the like. The most preferred Lewis acid catalysts are boron trifluoride, boron trifluoride etherate complexes, boron trifluoride amine complexes, and phosphorus pentachloride since excellent results are achieved in bulk polymerization processes employing trioxane as a formaldehyde reactant.

Typical of the Lewis bases which may be employed in the processes of this invention when using gaseous monomeric formaldehyde as the formaldehyde monomer are the organophosphines, organostibines, organoarsines, primary amines, secondary amines, tertiary amines, the alkali and alkaline earth metal hydroxides, oxides, peroxides and the like.

Other catalysts which may be employed in association with gaseous formaldehyde and diene monomers in the present polymerization process are onium salts, metals, metal alloys, metal carbonyls as well as various oxides, peroxides and hydroxides of the heavy metals.

The types of heterogeneous catalysts may be broadly defined as metal oxides, mixed metal oxides, acid clays, acid treated clays, and ion exchange resins. Acid types of heterogeneous catalysts are used in the polymerization of trioxane while the basic catalysts are employed in the polymerization of monomeric formaldehyde. However, acid ion exchange resins may in some instances be employed in both the copolymerization of trioxane or monomeric formaldehyde and the diene.

Typical examples of the heterogeneous catalysts are silica alumina, silica magnesia, silica zirconia, alumina boria, alumina magnesia, silica gel, Permutit S-2 (which is understood to be aluminum silicate), alumina chromia, Amberlite IR (which is understood to be a phenolic methylene sulfonic cation exchanger produced by the reaction of phenol, formaldehyde and sulfonic acid), montmorillonite and the like.

The amount of catalyst which may be employed in the processes of this invention is susceptible to variation. Generally the amounts ranging from about 0.001 to about 5 percent by weight of the total reaction mass may be employed. However, the preferred amount of catalyst ranges from 0.01 percent to about 2 percent by weight since within this range polymers having optimum properties such as strength, toughness, and resilience are obtained. The amount of catalyst employed in the present invention, although not critical, forms an important element of the processes, thus it is desirable to keep the catalyst concentration within the preferred range outlined hereinabove.

The temperature at which the polymerization process is conducted varies with the type of process employed. Thus in bulk polymerization processes temperatures ranging from about 50° C. up to about 120° C. are employed. In the solution polymerization processes reaction temperatures may vary from about —90° C. up to about 200° C., whereas in vapor polymerization processes temperatures between about —20° C. up to about 200° C. are employed.

The combination of temperature and the amount of catalyst employed has a direct bearing on the molecular weight of the polymer which is produced via this invention. Thus, in general, high conversions of low molecular weight polymers are obtained when high catalyst levels coupled with low polymerization temperatures are used. The same phenomena occurs where a low catalyst concentration is employed coupled with high temperatures. The preferred combination of temperature and amount of catalyst whereby a polymer having high molecular weight or high inherent viscosity is produced, involves the use of low catalyst level and low polymerization temperature. Thus, in a bulk polymerization process temperature ranges between about 65° C. up to about 90° C. and catalyst concentrations varying from about 0.01 percent to about 2 percent (based on the total weight of monomers being used) are preferred in accordance with this invention. In the preferred solution polymerization process, the temperature ranges from about 0° C. up to about 90° C., the catalyst concentration being the same as the bulk polymerization process.

The pressure employed in the polymerization processes of this invention depends generally upon the type of formaldehyde, diene, and catalyst being used and on the type of process technique being employed. Thus, in solution polymerization and vapor polymerization procedures, the pressure generally ranges from atmospheric up to about 20 atmospheres. It is preferred, for example, when using a gaseous diene to employ pressures higher than atmospheric, e.g., up to about 10 atmospheres since greater contact between or among the reactants is generally effective within this pressure range. Furthermore, these mild process conditions obviate the necessity for expensive, high pressure reaction equipment. In most cases, it is preferable to conduct the processes of this invention at atmospheric or ambient pressures.

The processes by which these novel copolymers are produced will be further understood from the following examples. In all of the examples all parts are by weight unless otherwise specified.

Examples I–II

Two copolymerization runs were made employing the bulk polymerization technique. Isoprene and 4-vinyl cyclohexene-1 were individually employed as the diene monomers. The technique employed comprised reacting 5 parts per hundred of each of the diene monomers under dry nitrogen with 100 parts of trioxane in the presence of boron trifluoride diethyl etherate catalyst and heating the mixture to 70° C. while stirring. The following table sets forth the reaction conditions and the results obtained by this copolymerization process.

TABLE I

[Copolymerization of isoprene and 4-vinyl cyclohexane-1 with trioxane]

| Comonomer | Phr. | BF$_3$ . Etherate, phr. | Time to Solidify, Min. | Conversion, Percent | PMT, ° C. | Tm, ° C. | n$_{inh}$ | Carbon, Percent | Hydrogen, Percent |
|---|---|---|---|---|---|---|---|---|---|
| Isoprene | 5 | 0.32 | 50 | 15 | 168 | 153 | 0.03 | 40.99 | 6.85 |
| 4-vinyl cyclohexene-1 | 5 | 0.08 | | 12 | 167 | | 0.04 | 41.14 | 6.98 | n$_{inh}$=Inherent viscosity; PMT=Polymer melt temperature; Tm=Crystalline melting point.

Example III

Four copolymerization runs were made using a non-conjugated diene, 2,5-hexadiene. The bulk polymerization technique was employed whereby the diene (5 weight percent) was added to a reaction vessel containing trioxane (20 parts). The comonomers were kept under dry nitrogen and boron trifluoride dibutyl etherate catalyst was added to the mixture. The reaction mixture was heated to 55° C. while stirring. The following table sets forth the reaction conditions and results obtained by the copolymerization of trioxane with 2,5-hexadiene.

TABLE II
[Copolymerization of trioxane with 2,5-hexadiene at 55° C.]

| Comonomer | Catalyst, ml. | Time, Hrs. | Tm, ° C. | PMT, ° C. | $n_{inh}$ | Yield, Percent | Carbon, Percent | Hydrogen, Percent |
|---|---|---|---|---|---|---|---|---|
| 2,5-hexadiene | 0.1 | 1 | 158 | 165–75 | 0.18 | 8 | 41.70 | 7.17 |
| Do | 0.1 | 2 | 156 | 167–82 | 0.28 | 12 | 41.20 | 6.94 |
| Do | 0.2 | 1 | 152 | 168–84 | 0.18 | 20 | 41.18 | 6.94 |
| Do | 0.3 | 1 | 156 | 173–75 | 0.27 | 25 | 41.40 | 6.78 |

$n_{inh}$=Inherent viscosity; PMT=Polymer melt temperature; Tm=Crystalline melting point.

Example IV

Formaldehyde vapor obtained from the pyrolysis of 100 parts of paraformaldehyde containing 10 parts of silica aluminum catalyst was passed over a 3 hour period through a cold train at −15° C. into a vented magnetically stirred Pyrex reactor. The reactor contained 750 parts by volume of essentially anhydrous n-heptane as the diluent, 5 parts per hundred of triphenyl phosphine catalyst, and 54 parts of 1,3-butadiene. The temperature of the reaction mass was maintained at 25–30° C. with stirring. The copolymer was recovered immediately by filtration and washed with benzene and extracted with boiling methanol and thereafter dried under vacuum to a constant weight. 1.5 grams of the copolymer was recovered. The butadiene formaldehyde copolymer had an inherent viscosity of 0.6 and a polymer melt temperature of 168° C. The crystalline melt point of the copolymer was 152° C.

Example V

The procedure of Example IV was repeated except that the silica alumina was omitted from the paraformaldehyde pyrolysis step. 75 parts of paraformaldehyde was pyrolyzed in a 3 hour period and vented into a Pyrex reactor containing 54 parts of 1,3-butadiene. 17 grams of the butadiene formaldehyde copolymer was recovered and had an inherent viscosity of 0.9. The polymer melt temperature was 174° C. and the crystalline melt point was 154° C. The polymer so obtained was readily hot pressed into plaques by placing the polymer powder between aluminum sheeting and pressing at 154° C. Essentially no degradation occurred during the pressing.

Example VI

The procedure of Example IV was repeated except that 50 parts of isoprene was substituted for butadiene. The isoprene had been previously dried and purified. 33 parts of formaldehyde-isoprene copolymer was obtained which had an inherent viscosity of 1.7. The polymer melt temperature of the copolymer was 189° C. and the crystalline melt point was 158° C. The polymer was readily hot pressed into a flexible bubble free plaque.

Example VII

The procedure of Example VI was repeated except that the reaction temperature was held at 45–50° C. 20 parts of the isoprene-formaldehyde copolymer was obtained which had an inherent viscosity of 1.0. The polymer melt temperature of the copolymer was 175° C. The copolymer of formaldehyde and isoprene was capable of being hot pressed into plaques after recovery.

Example VIII

Formaldehyde vapor derived from the pyrolysis of 75 parts of paraformaldehyde was passed through a cold train at −15° C. and into a Pyrex reactor containing 750 parts by volume of n-heptane diluent, 25 parts of isoprene and 3 parts per hundred of butyl lithium catalyst. The temperature of the reactor was held at 25–30° C. during the 3 hours while maintaining constant stirring. The polymer was recovered from the reactor and filtered and extracted with warm benzene water and methanol and dried to a constant weight under vacuum. 12 parts of the white isoprene-formaldehyde copolymer was obtained.

Example IX

Formaldehyde vapor was essentially anhydrous and passed into a reactor at 25–30° C. containing 50 parts by volume of n-heptane, 25 parts of butadiene and a Ziegler type catalyst comprising 5 parts per hundred titanium tetrachloride and 15 parts per hundred of triethyl aluminum. The formaldehyde-butadiene copolymerization reaction was continued over a 3 hour period with constant stirring. The polymer so obtained was filtered from cold heptane, extracted with boiling methanol and dried to a constant weight under vacuum. 10 parts of the polymer was obtained which had an inherent viscosity of 0.8. The polymer melt temperature was 160° C. The polymer was analyzed as containing 46.88 percent carbon and 7.25 percent hydrogen. It was determined from these carbon hydrogen percentages that the copolymers contained 14.1 percent butadiene and 85.9 percent formaldehyde.

Example X

To a reaction flask was added 750 ml. of n-heptane, 0.5 moles of butadiene and 20 mmoles of butyl lithium. This mixture was stirred in the reactor under nitrogen atmosphere at 25–30° C. Monomeric formaldehyde which was obtained by pyrolyzing paraformaldehyde was added to this mixture continuously for 3 hours. During the reaction time the mixture was continually stirred and the reaction vessel was maintained at a temperature of from 25–30° C. The copolymer produced was recovered by filtration, followed by extraction with warm heptane, washing with boiling methanol and thereafter dried under vacuum. The copolymer of butadiene and formaldehyde was white and slightly rubbery. The percentage of carbon was determined to be 64.34 percent and 8.73 percent hydrogen which indicated that the copolymer contained 50 percent butadiene and 50 percent formaldehyde.

Examples XI–XIII

Three bulk copolymerization runs were made employing trioxane with each of squalene, 1,3-cyclooctadiene and 1,5-cyclooctadiene. Each of the diene monomers were added to a reaction vessel containing 20 parts of trioxane under dry nitrogen. The reaction mass was heated to 70° C. with stirring. The following table sets forth the reaction conditions, amounts of monomer and catalyst and the results obtained in each of the copolymerization processes.

TABLE III

[Copolymerization of trioxane with dienes at 70° C. using boron trifluoride diethyl etherate as a catalyst]

| Comonomer | Phr. | $BF_3 \cdot$ Etherate, phr. | Conversion, Percent | PMT, °C. | $n_{ink}$ | Carbon, Percent | Hydrogen, Percent |
|---|---|---|---|---|---|---|---|
| Squalene | 3 | 0.16 | 10 | 166 | 0.34 | 41.32 | 6.94 |
| 1,3-cyclooctadiene | 5 | 0.22 | 3 | 183 | | 40.18 | 6.84 |
| 1,5-cyclooctadiene | 1 | 0.36 | 32 | 165 | 0.20 | 41.14 | 6.92 |

$n_{ink}$ = Inherent viscosity; PMT = Polymer melting temperature.

The novel interpolymers of the present invention are resistant to chemical degradation. When the copolymers of this invention are treated with a 10 percent aqueous sodium hydroxide solution at temperatures between room temperature and reflux temperature for from about one minute to about one hour, the net polymer loss ranges from about 2 percent to about 60 percent. Thus, in preparing the novel copolymers of this invention, it is desirable to first submit the raw copolymer product to a caustic treatment. Thus, in treating the crude copolymer it is desirable to use an alkaline solution having a pH of between about 8 and about 14 at about room temperature up to about 90° C. for a time ranging from about 1 to about 10 minutes. For reasons of economy and time, it is desirable to contact the crude copolymers of this invention with a 10 percent aqueous sodium hydroxide solution. The products thus obtained are even more stable to heat, light and oxidation. The strong bases which can be used in this preferred after-treatment include the alkali and alkaline earth metal hydroxides, oxides, carbonates, acetates and the like; strong organic bases; ammonia, and the like. Typical examples of these bases which may be employed are potassium hydroxide, calcium oxide, barium hydroxide, magnesium oxide, sodium carbonate, sodium acetate, calcium propionate, ammonia, dimethyl amine, diethyl amine, dipropyl amine, dibutyl amine, tetramethyl guanidine and the like.

In effecting this after-treatment systems other than aqueous alkaline systems may be employed. Thus, the appropriate strong base may be dissolved in a solvent such as dimethyl formamide, benzyl alcohol, methanol, anisole, ethylene glycol, or the like. In some instances, alkaline solvent systems which contain a hydroxyl group such as benzyl alcohol, methanol and ethylene glycol, function as the agent of controlled degradation even in the absence of the above basic substances.

Typical of the Lewis acid catalysts which may be employed in the process of this invention are antimony trifluoride, antimony fluoborate, bismuth fluoride, bismuth oxyfluoride, nickelous fluoride, aluminum trifluoride, titanium tetrafluoride, manganous fluoride, manganic fluoride, mercuric fluoride, silver fluoride, zinc fluoride, ammonium bifluoride, phosphorus pentafluoride, hydrogen fluoride, fluosulfonic acid, antimony chloride, stannous chloride, sodium fluoride, potassium fluoride, lithium fluoride, calcium fluoride, magnesium fluoride, barium fluoride, strontium fluoride, lead fluoride, ferric fluoride, ammonium fluoride, thionyl chloride, phosphorous trichloride, stannic chloride, titanium tetrachloride, zirconium chloride, boron trifluoride, diethyl etherate complex, boron trifluoride dibutyl etherate complex, boron fluoride complexes of aryl amines such as aniline, alpha naphthyl amine, pentanaphthyl amines, diphenyl amine and benzidine, boron trifluoride complexes of pyridine, phenothiazine, glycine, alpha alanine, semicarbazide, urea and the like.

Typical examples of Lewis base catalysts which may be employed in the process of this invention are triphenyl phosphine, tritolyl phosphine, trixylyl phosphine, trinaphthyl arsine, tributyl phosphine, triethyl stibine, dimethyl phenyl arsine, tricyclohexyl phosphine, methyl dioctyl stibine, dixylyl ethyl arsine, trimethyl amine, triethyl amine, trihexyl amine, diethyl amine, di-N-propyl amine, dioctyl amine, cyclohexyl amine, dicyclohexyl amine, piperidine, N-ethyl piperidine, morpholine, N-methyl morpholine, pyrrolidene, N-ethyl pyrrolidine, cesium hydroxide, strontium hydroxide, rubidium hydroxide, sodium hydroxide, potassium hydroxide, lithium hydroxide, barium hydroxide, calcium hydroxide, sodium oxide, sodium peroxide, barium peroxide and the like.

Typical examples of onium salts which may be employed as catalysts are trimethyl stearyl ammonium laurate, tetra-N-butyl ammonium laurate, triethyl benzyl ammonium laurate, benzyl trimethyl ammonium nonyl phenolate, dimethyl diammonium acetate, dimethyl diammonium benzoate, dimethyl dioctadecyl ammonium acetate, N,N-diethyl piperdinium chloride, tetra-N-butyl ammonium iodide, N-phenyl ethyl tetramethylene ammonium iodide, dibutyl octadecamethylene ammonium acetate, bis-(tri-N-butyl ammonium iodide)propane, betaine methyl ester of N-methyl-N-phenyl glycine, 1-(carboxy methyl)pyridinium betaine, (carboxy methyl) tridecyl ammonium chloride, triethyl octadecyl phosphonium bromide, tetraethyl phosphonium iodide, tributyl ethyl phosphonium iodide, phenyl ethyl pentamethyl phosphonium acetate, bis-(triethyl phosphonium acetate) butane, tributyl sulfonium bromide, trimethyl sulfonium iodide, phenyl dibutyl sulfonium acetate, cyclohexyl diethoxy sulfonium benzoate and the like.

Metal alloy catalysts which may be employed in the process of this invention are alloys of aluminum with copper, silver, gold, beryllium, magnesium, calcium, strontium, barium, zinc, cadmium, mercury, silicon, titanium, zirconium, germanium, tin, lead, vanadium, niobium, tantalum, antimony, bismuth, chromium, molybdenum, tungsten, manganese, iron, nickel. Specific alloys which have been satisfactory in the past are aluminum magnesium alloys, aluminum cobalt alloys, aluminum copper alloys, aluminum copper manganese alloys, aluminum silicon alloys, aluminum zinc alloys, aluminum magnesium titanium alloys, and alloys containing aluminum, cadmium, zinc, calcium and lithium as well as amalgams of all of the alloys listed hereinabove.

Typical of the organometallic compounds which may be used in the process of this invention as catalysts are phenyl lithium methoxy phenyl sodium, decoxy sodium, copper mercaptide, copper abietate, copper stearate, methyl magnesium iodide, phenyl magnesium bromide, diethoxy magnesium calcium hydride, dimethyl cadmium, diphenyl mercury, calcium isopropioxide, aluminum stearate, tetraisopropyl titanate, diphenyl tin, triphenyl bismuth, dicyclopentadienyl iron, triethyl aluminum, trimethyl aluminum, tri-N-butyl aluminum, triisopropyl aluminum, cobalt carbonyl, iron carbonyl, nickel carbonyl and the like.

Typical of the heterogeneous mixtures of catalysts which may be employed in the process of this invention are silica alumina, Amberlite IR (acid form) as described hereinbefore, montmorillonite (mixture of silica alumina and magnesia), silica gel, Permutit S-2 (basic form) as described hereinbefore, alumina chromia, silica magnesia, silica boria, silica zirconia, alumina boria, as well as other metal oxides, mixed metal oxides and ion exchange resins.

Other forms of heterogeneous catalysts which may be used in the process of this invention are disclosed in "Ion Exchange Technology," Academic Press, New York (1956); "Ion Exchange Resins," by Kunin and Myers, John Wiley and Sons (1950); and "Dowex Ion Exchange," the Dow Chemical Company (1958).

The term diene as used in the instant invention may be further defined as an unsaturated hydrocarbon with two or more double bonds. Thus, dienes within the ambit of this invention would have formulas such as $C_nH_{2n-2}$, $C_nH_{2n-4}$, $C_nH_{2n-6}$, $C_nH_{2n-8}$, and the like wherein $n$ is an integer having a value from 3 to about 30. Thus, typical examples of the diene monomers which may be employed in this invention are allene, 1,3-butadiene, 1,2-butadiene, 2,3-dimethyl butadiene, diallyl, 1,3-pentadiene, isoprene, 1,4-heptadiene, 1,5-hexadiene, 1,6-octadiene, 1,5-cyclohexadiene, 1,4-cyclooctadiene, 4-vinyl cyclohexene-1,2-vinyl cyclooctadecene-4, cumulenes, squalene, 4-vinyl cyclohexadiene-1,5, and the like.

Although the polymers of this invention have improved resistance to chemical and physical degradation, nevertheless for some uses it may be desirable to make use of previously known stabilization techniques in order to effect still further improvement in stability. The techniques which may be so used are in general those procedures which have heretofore been successfully used with hitherto known polyformaldehyde polymers and copolymers. Therefore stabilizer additives may be compounded with the novel polymers of this invention. Typical of these stabilizer additives are hydrozines (U.S. 2,810,708); hydrozones (Belgian 597,962); phenols (U.S. 2,871,220); ureas and thioureas (U.S. 2,893,972); sulfides and polysulfides (Belgian 599,409); amines (U.S. 2,920,059 and 2,936,298); oxalic diamides (Belgian 584,257); polysulfonic acids (Belgian 585,164); hydroxy anthroquinone (Belgian 585,165); and benzophenones (Australian 230,-163). These stabilizers may be compounded with the novel interpolymers of this invention after the polymerization reaction has been completed.

Similarly the interpolymers may be end capped in lieu of the preferred caustic after-treatment step, by reacting the terminal hydroxyl groups of the copolymer with an anhydride such as acetic anhydride (U.S. 2,964,500); or a dialkyl acetal (Belgian 570,884); to esterify the groups.

The polymers may also be subjected to a combination of the compounding of stabilizers and end capping. Thus one may end cap the crude polymer by reacting the polymer with an anhydride and thereafter compound stabilizers such as hydrazines, phenols, ureas and the like with the polymer product.

Another technique by which additional stabilization may be achieved is to rigorously remove catalyst residues from the novel polymers of this invention. Thereupon, if desired, a stabilizer additive or end capping procedure, or both, may be utilized.

A still different combination which may be used to further stabilize the interpolymers involves caustic treatment followed by addition of stabilizers. Any of the stabilizers referred to hereinabove may be employed subsequent to the preferred caustic after-treatment step. This combination of caustic after-treatment and subsequent addition of stabilizers is the most preferred method of giving additional stabilization to the interpolymers of this invention.

In all cases where a stabilizer additive is used, it is compounded with the interpolymer in a proportion of between about 0.003 and 15 percent by weight based on the weight of the polymer. It should be noted that the stabilizers may, in some instances, be added prior to the caustic degradation step. However, it is preferred in most instances to add the stabilizers after the caustic degradation step since a polymer is obtained via this method which is more resistant to thermal degradation and oxidative deterioration.

The copolymers of this invention are useful for the preparation of films (as disclosed in U.S. 2,952,878), sheets, funicular structures such as fibers, filaments, bristles, rods, tubes and molding powders. Thus, the copolymer of this invention may be employed in any general use for which known tough and thermally stable thermoplastic polymers have been put.

Typical methods of molding the interpolymers of this invention are those techniques set forth in "Polymer Processes," vol. X, "High Polymers" by Schildknecht, Interscience Publishers New York (1961). Typical of the described techniques at page 688 are compression molding, jet molding, transfer molding, injection molding, extrusion, etc.

Having thus described this unique invention and its embodiments, it is not intended that this invention be limited except as set forth in the following claims.

What is claimed is:

1. A high molecular weight, thermoplastic polyoxymethylene interpolymer of (a) a formaldehyde selected from the group consisting of essentially anhydrous monomeric formaldehyde and essentially anhydrous trioxane, and (b) a diene monomer having the formula $R''=R'=R$ wherein each of R, R' and R'' are hydrocarbon groups each containing from 1 to about 18 carbon atoms, the amount of said monomer chemically combined in said interpolymer ranging from about 0.1 mole percent to about 20 mole percent of the interpolymer, said interpolymer having a polymer melting temperature of from about 140° C. up to about 190° C.

2. The composition of claim 1 wherein said diene monomer is isoprene.

3. The composition of claim 1 wherein said diene monomer is 4-vinyl cyclohexene-1.

4. The composition of claim 1 wherein said diene monomer is 2,5-hexadiene.

5. The composition of claim 1 wherein said diene monomer is 1,3-butadiene.

6. The composition of claim 1 wherein said diene monomer is squalene.

7. The composition of claim 1 wherein said diene monomer is 1,3-cyclooctadiene.

8. The composition of claim 1 wherein said diene monomer is 1,5-cyclooctadiene.

9. The process of preparing a high molecular weight, thermoplastic polyoxymethylene interpolymer comprising copolymerizing under essentially anhydrous conditions a formaldheyde selected from the group consisting of essentially anhydrous monomeric formaldehyde and essentially anhydrous trioxane in admixture with a diene monomer having the formula $R''=R'=R$ wherein each of R, R' and R'' are hydrocarbon groups each containing from about 1 to about 18 carbon atoms and a polymerization catalyst that is effective under said essentially anhydrous conditions; said diene monomer being employed in an amount ranging from about 0.1 to about 20 mole percent of said formaldehyde; said copolymerization being conducted at a temperature in the range of from about −90° C. up to about 200° C. and at a pressure of from about atmospheric up to about 15 atmospheres.

10. The process of claim 9 wherein said formaldehyde is essentially anhydrous trioxane.

11. The process of claim 9 wherein said diene monomer is isoprene.

12. The process of claim 9 wherein said diene monomer is 4-vinyl cyclohexene-1.

13. The process of claim 9 wherein said diene monomer is 2,5-hexadiene.

14. The process of claim 9 wherein said diene monomer is 1,3-butadiene.

15. The process of claim 9 wherein said diene monomer is squalene.

16. The process of claim 9 wherein said diene monomer is 1,3-cyclooctadiene.

17. The process of claim 9 wherein said diene monomer is 1,5-cyclooctadiene.

18. The process of claim 9 wherein the formaldehyde is essentially anhydrous monomeric formaldehyde.

19. The composition of claim 1 wherein said formaldehyde is essentially anhydrous monomeric formaldehyde.

20. The composition of claim 1 wherein said formaldehyde is essentially anhydrous trioxane.

References Cited

UNITED STATES PATENTS

| | | | |
|---|---|---|---|
| 3,087,913 | 4/1963 | Kray et al. | |
| 3,116,267 | 12/1963 | Dolce. | |
| 3,036,056 | 5/1962 | Rion | 260—94.7 |
| 3,027,352 | 3/1962 | Walling et al. | |
| 3,076,786 | 2/1963 | Brown et al. | |
| 3,196,098 | 7/1965 | Mochel | 204—158 |
| 3,225,121 | 12/1965 | Baker | 260—874 |
| 3,296,210 | 1/1967 | Wilson et al. | 260—73 |
| 3,317,477 | 5/1967 | Wilson et al. | 260—73 |

FOREIGN PATENTS

| | | |
|---|---|---|
| 614,946 | 7/1962 | Belgium. |
| 1,272,971 | 8/1961 | France. |

OTHER REFERENCES

Kambara et al., Journal of Polymer Science, vol. 27, No. 115.

Hohr et al., Die Makromolekulare Chemie, vol. 52.

Kunststoffe, vol. 53, July 1963.

Okamura et al., Isotopes and Radiation, vol. 3, No. 3, 1960, pp. 242–243.

WILLIAM H. SHORT, *Primary Examiner.*

HAROLD D. ANDERSON, L. M. PHYNES,
*Assistant Examiners.*